May 23, 1944.　　W. B. SCHUEREN　　2,349,466
FENDER SHIELD LATCH MECHANISM
Filed Oct. 2, 1941　　3 Sheets-Sheet 1
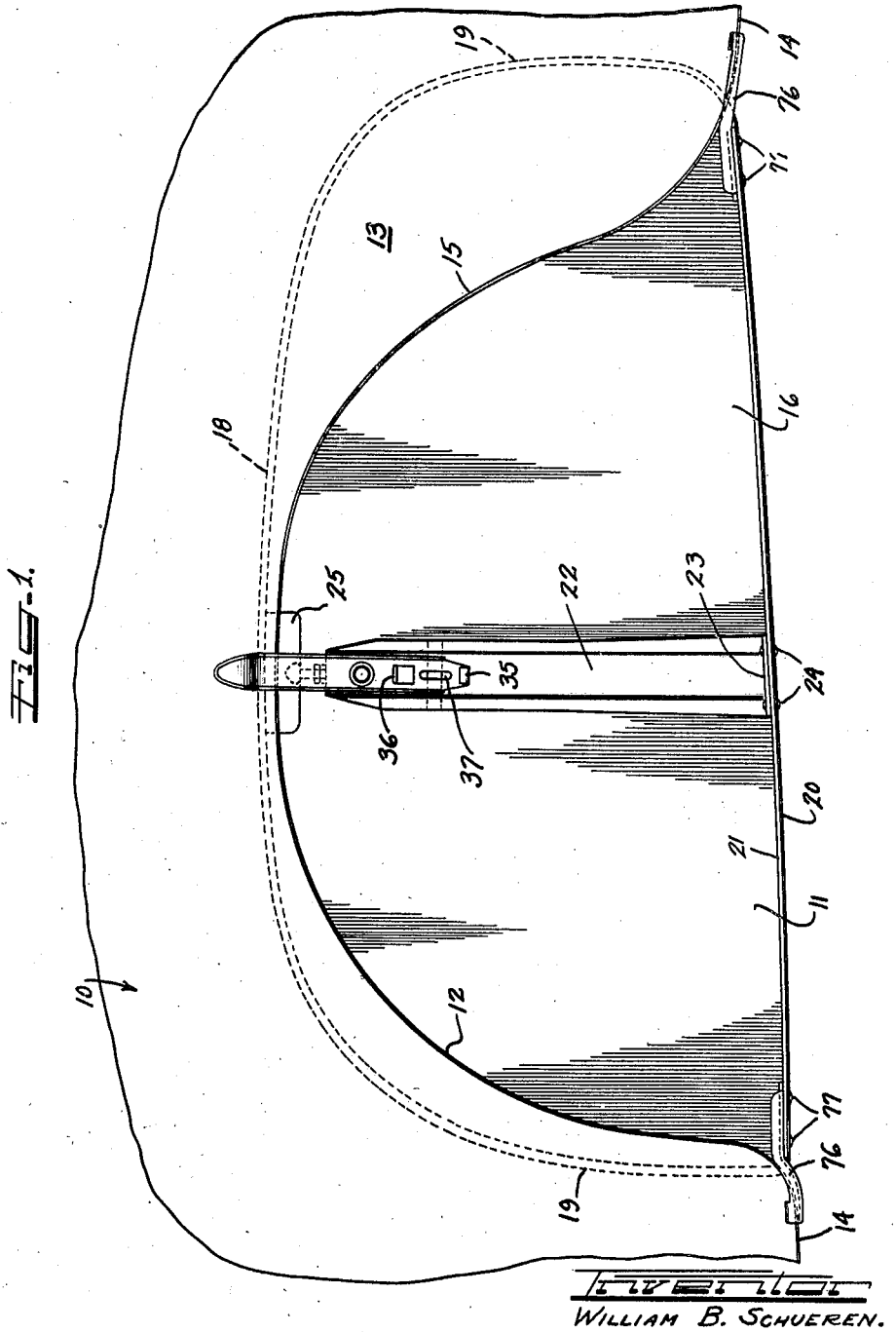
Inventor
WILLIAM B. SCHUEREN.
by Charles A. Allys.
Attys.

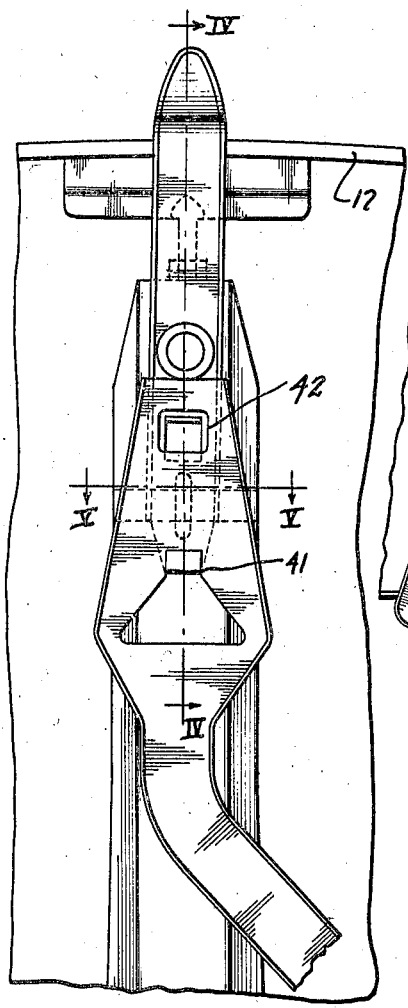
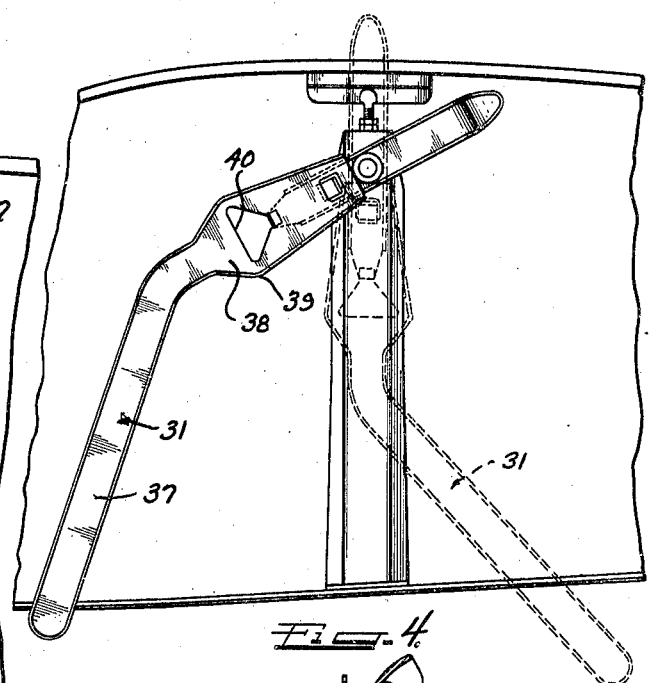
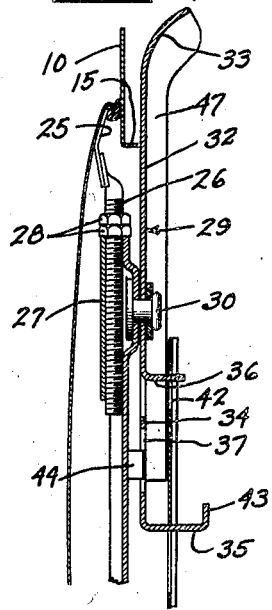
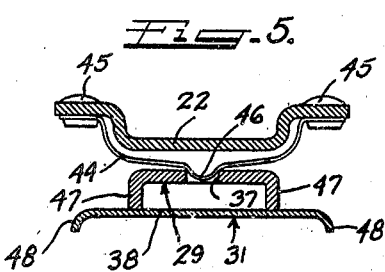

May 23, 1944.  W. B. SCHUEREN  2,349,466
FENDER SHIELD LATCH MECHANISM
Filed Oct. 2, 1941  3 Sheets-Sheet 3
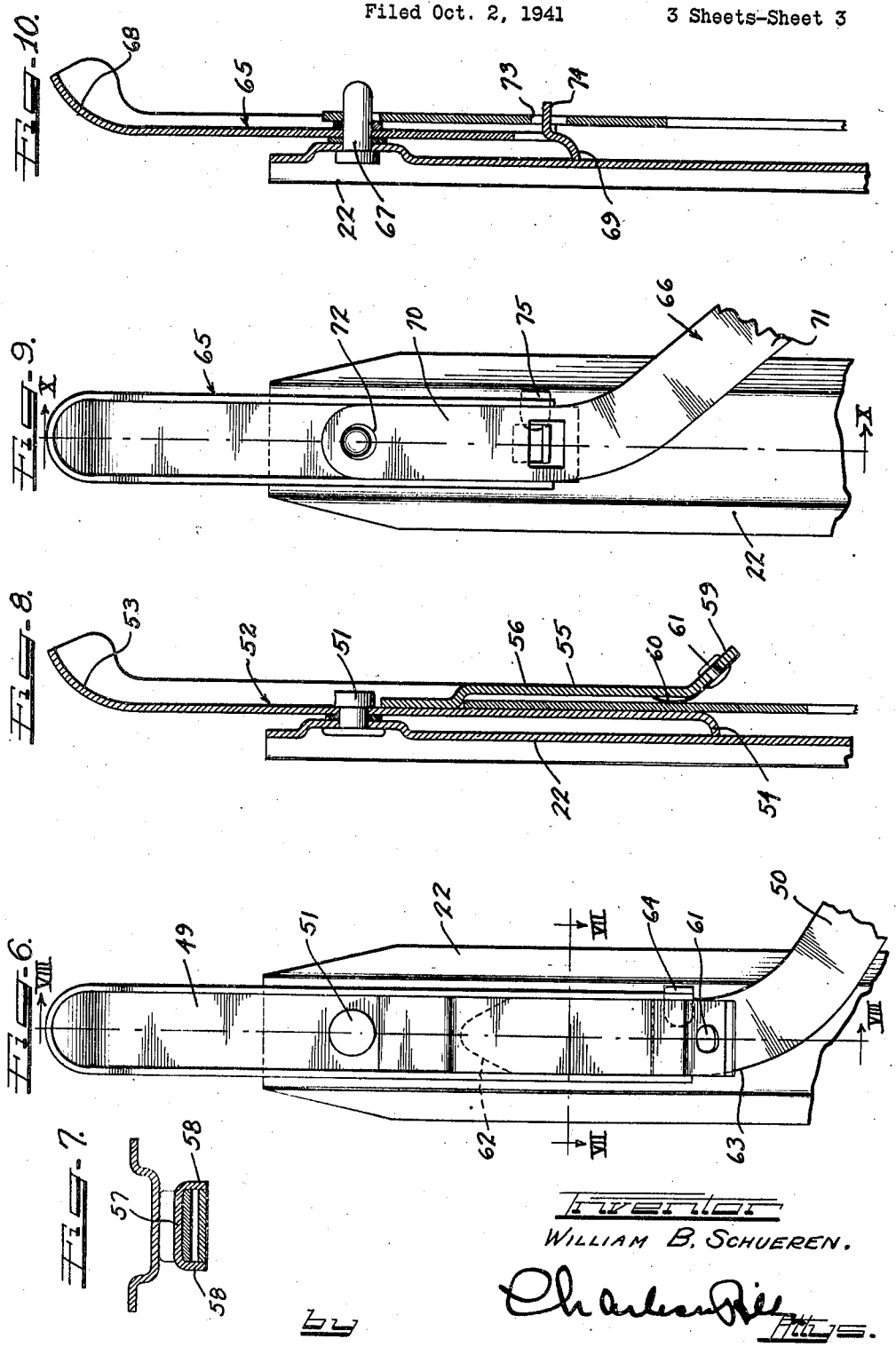
Inventor
WILLIAM B. SCHUEREN.

Patented May 23, 1944

2,349,466

UNITED STATES PATENT OFFICE 2,349,466

FENDER SHIELD LATCH MECHANISM

William B. Schueren, Detroit, Mich., assignor to Houdaille-Hershey Corporation, Detroit, Mich., a corporation of Michigan Application October 2, 1941, Serial No. 413,247

2 Claims. (Cl. 292—209)

This invention relates to fender shield latching mechanisms, and more particularly to a fender shield latching mechanism which is provided with a removable lever operating member.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

Since fender shields are mounted on a vehicle in a place which is readily accessible it has been found desirable to provide some means which will deter or make it difficult for a thief or other unauthorized person to remove the fender shield from its mounted position on the vehicle. One of the important features of the present invention is to provide a latch mechanism for securing a fender shield to a vehicle fender in which the operating handle or member may be quickly and easily removed from the remaining portion of the latch mechanism after the shield has been mounted in place. This operating handle or lever may then be kept by the user of the vehicle in a locked place, such as in the trunk or luggage compartment of the vehicle.

As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the body, and whether or not it projects outwardly away from the principal body portion of the vehicle.

It is an object of the present invention to provide a novel fender shield latch mechanism in which a portion of the latch mechanism is removed after the fender shield has been mounted on the fender for the purpose of detering and hindering the unauthorized removal of the fender shield from the fender.

It is the further object of this invention to provide a fender shield latch mechanism in which the manually engaged operating member or lever may be removed after the latch mechanism has been moved to its locking position.

A still further object of the present invention is to provide a latch mechanism including a removable lever arm which extends across the rear face of the fender shield.

Another and further object of the present invention is to provide a latching mechanism having a removable operating lever and dust excluding means for preventing the infiltration of dust and other foreign material when the operating lever is removed.

Another and still further object of the present invention is to provide a two-part latching means for securing a fender shield to a vehicle fender.

The novel features which I believe to be characteristic of my invention are set forth with particularity in the appended claims. My invention itself, however, both as to its organization and manner of construction, together with further objects and advantages thereof, may best be understood by reference to the accompanying drawings, in which:

Figure 1 is a rear elevational view of a vehicle fender and fender shield assembly having a latching mechanism in which the operating lever has been removed;

Figure 2 is a fragmentary elevational view of the latching mechanism shown in Figure 1, but with the operating lever in position in the assembly and with the latching finger turned to a disengaged position with respect to the fender;

Figure 3 is an enlarged fragmentary elevational view of the latching mechanism shown in Figure 2, but with the latching finger moved to its latched position;

Figure 4 is a fragmentary vertical sectional view of the latching mechanism taken along the line IV—IV of Figure 3;

Figure 5 is a horizontal sectional view through the latching mechanism as taken along the line V—V of Figure 3;

Figure 6 is a fragmentary vertical sectional view of another embodiment of my novel latching mechanism;

Figure 7 is a horizontal sectional view through the latching mechanism of Figure 6, as taken along the line VII—VII thereof;

Figure 8 is a vertical sectional view through the latching mechanism of Figure 6, as taken along the line VIII—VIII thereof;

Figure 9 is a fragmentary elevational view of a third embodiment of my novel latching mechanism; and, Figure 10 is a vertical sectional view through the latching mechanism of Figure 9, as taken along the line X—X thereof.

Referring now to the Figures 1 to 5, which illustrate one embodiment of the present invention, I have shown a fender and fender shield assembly comprising a fender 10 and a fender shield 11 mounted thereon over the wheel access opening 12 in the outer depending side wall 13 of the fender 10.

The fender 10 is provided with a bent back flange along its base portions as at 14 and around the opening 12 as at 15. These flange portions 14 and 15 fit the fender in a manner well known to those skilled in the art.

The fender shield 11 comprises a panel portion 16 which has a rolled edge 17 which is arranged to overlap the opening 12 in the fender 10 and be seated thereon. The top portion 18 of the fender shield is relatively flat and gradually merges into end portions 19 which extend downwardly in a gradual curve to the base edge of the fender shield which is defined by a rearwardly extending stiffening flange 20. This stiffening flange 20 is preferably reinforced by a flat bar 21 which is secured to the shield in a manner presently to be described.

A pair of hook-shaped supporting arms 76 are riveted to the base flange 20 through the reinforcing bar 21 as at 77. These rivets 77 serve to secure not only the supporting arms 76, but also the end portions of the bar 21 to the base flange 20. The supporting arms 76 extend out beyond the two lower corners of the fender shield 11 and are arranged to extend around the base edges 14 of the fender 10 and to thereby provide vertical support for the fender shield 11 on the fender 10. While the manner of supporting the fender shield at the two lower corners forms no part of the present invention, it may be stated at this time that the fender shield is mounted on the fender by lifting the shield into a position opposite the opening 12, hooking the arms 76 around the base edges 14 and then rocking the top portion of the fender shield against the fender with the two arms 76 acting as trunnion members which enables movement of the fender shield in a plane transverse to the fender opening. The top of the fender shield is secured against the fender by a latch mechanism presently to be described.

To further reinforce the fender shield 11, a brace bar or strut 22 extends upwardly behind the panel portion 16 from the lower edge 20 to a point in proximity to the top portion 18 of the fender shield 11. This brace bar 22 has a base portion 23 which is seated on the reinforcing bar 21 and which is riveted or bolted through the reinforcing bar 21 to the base flange 20 by the rivets 24. The rivets 24 thus secure the bar 21 to the base flange 20 as well as securing the strut 22 to the base flange 20.

In order that the brace bar strut 22 may possess sufficient rigidity without an undue amount of metal being formed therein, it is preferably channel-shaped in cross section. Mounted on the top of the strut 22 is a vertically adjustable plate member 25 which extends up into and against the curled edge portion 17 of the fender shield 11. The novel features of this brace bar and a novel manner in which it may be secured to the fender shield 11 are described in detail and claimed in the George W. Schatzman United States Letters Patent No. 2,241,043, entitled "Fender shield and mounting means therefor" granted May 6, 1941.

Referring to Figure 4, the vertically adjustable plate or flat shoe 25 fits in under the flange 17 which holds the upper end of the strut 22 in place. The plate 25 is connected to the strut 22 by means of a stud 26 which is spot welded to the plate 25 and extends down into a tube formed by a small stamping 27 spot welded to the face of the strut 22 at its upper end. The stud 26 is threaded but the tube 27 into which it fits is not threaded, thereby leaving the stud 26 free to slide vertically with respect to the strut 22 and the tube 27. Positioning of the plate 25 and stud 26 with respect to the strut 22 and the tube 27 is accomplished by means of a pair of nuts 28 threaded onto the stud 26 above the end of the strut 22. The lower one of the two nuts 28 bears against the top of the strut 22 and the tube 27 and forces the plate 25 and the stud 26 upwardly so that the plate 25 is held in tight engagement with the edge of the fender shield 11. The upper one of the two nuts 28 serves as a lock nut.

The novel latch mechanism of the present invention is mounted on the upper end of the strut 22. The latch mechanism includes, in general, a latching finger 29 pivotally mounted on the upper end of the strut 22 by a rivet 30, and an operating lever or handle 31. The rivet 30 is shaped and dimensioned so as to permit angular movement of the latching finger 29 thereabout. As shown in Figures 1, 3 and 4, the latching finger 29 extends upwardly in a principal body portion 32 and terminates at its upper end in a gradually bent back arcuately shaped tip portion 33. The latching finger 29 also has a tail portion 34 which extends downwardly from the pivot point 30 and terminates in a hook-shaped lower end portion 35. The tail portion 34 has a tongue 36 struck rearwardly from it and is also provided with an elongated slot opening 37 which is located between the struck out tongue 36 and the hook-shaped end 35.

The operating handle or lever 31 is arranged to be hooked onto the tail portion 34 of the latching finger 29 by means of the tongue 36 and the hook-shaped lower end 35. This operating member or lever 31 is of angular shape and has a long handle portion 37 and a relatively short upper portion 38 which is disposed at an angle to the handle portion 37. The upper portion 38 is formed with a relatively wide part 39 having a triangular-shaped opening 40 therein. The apex of the triangular-shaped opening 40 which is nearest to the pivot point 30 is cut back as at 41 to receive the hook-shaped end 35 of the latching finger 29. The upper portion 38 of the operating lever 31 is also provided with a rectangular opening 42 close to its upper end. The rectangular opening 42 is arranged to receive the tongue 36 of the latching finger 29.

In order to hook the operating lever 31 onto the latching finger 29 the upper end 38 of the operating lever 31 is moved over the tongue 36 and the hook-shaped end 35 of the latching finger 29. As the lever 31 is being moved over the tongue 36 and the hook-shaped lower end 35, the tongue 36 will be close to the bottom of the opening 42, as this will enable the upturned tip 43 of the hook-shaped end 35 to pass through the opening 40 in the lever 31. As the upturned tip 43 is passed through the opening 40 the lever may be dropped down until the cut out portion 41 of the opening 40 settles over the hook-shaped end 35. The lever may now be manually manipulated to rotate the latching finger 29 into and out of engagement with the inturned edge 15 of the fender 10.

In order to retain the latching finger 29 in its latched position when the vehicle is traveling over a rough road or other surfaces, a leaf-shaped spring 44 is riveted to the strut 22 as at 45. The spring 44 has a transverse pressed out rib or ridge 46 therein which is arranged to extend into engagement with the side edges of the elongated slot 37.

In order that both the latching finger 29 and the operating lever 31 may have sufficient stiffness and rigidity without employing an undue amount of metal, both of these members are preferably provided with turned out edges 47 and 48, respectively.

To remove the operating lever 31 after it has been used to rotate the latching finger 29 into its latched position, against the fender 10, it is simply necessary to lift up on the lever 31 and unhook it from the hook-shaped end portion 35 and the tongue 36 of the latching lever 29. The operating lever 31 may then be placed in the trunk or other locked compartment of the vehicle.

In Figures 6, 7 and 8 of the drawings, I have illustrated another embodiment of the present invention. These figures illustrate the latching mechanism only, and it will, of course, be understood that it is arranged to be mounted on a fender shield, such, for example, as a fender shield of the type shown in Figure 1. The latching mechanism of the embodiment of the invention shown in Figures 6, 7 and 8 includes a latching finger 49 and an operating handle or lever 50. The latching finger 49 is pivotally mounted on the strut 22 as at 51. The latching finger 49 includes a principal body portion 52 which terminates at its upper end in a curved back arcuately shaped upper end portion 53 and a turned in lower end portion 54. A stamping 55 is spot welded at its upper end to the latching finger 52. The main body portion 56 of the stamping 55 is spaced from the bottom 57 of the latching finger 52 but is in engagement with the sides 58, it being understood that the bottom 57 and the sides 58 of the latching finger 52 provide a channel-shaped member. The lower end of the stamping 55 is bent obliquely outwardly as at 59 and a resilient tongue 60 is riveted thereto as at 61. The operating member lever 50 has a tapered end portion 62 which facilitates inserting the short leg 63 up into the pocket provided by the latching finger 52 and the stamping 55.

When the handle member or lever 50 is removed, the spring 60 snaps over against the main body portion of the latching finger 52 and thereby excludes dirt and other foreign material from becoming lodged in the pocket provided by the stamping 55, it being understood that the spring tongue 60 is substantially the same width as the distance between the flanges 58 of the latching finger 52.

In order that the operator of the mechanism may be assured that the latching finger is in a proper upright position when he is mounting the fender shield in the fender in the dark, or from a position where he does not see the latching finger 52, a stop is provided by striking a tongue 64 from the strut 22 (see Figure 6). The tongue 64 is positioned so that the lower end of the latching finger 52 will strike this stop when it is rotated to its upright position. The tongue 64, in other words, is located in the path of movement of the lower end of the latching finger 52.

The operating member or lever 50 may be readily reassembled in the latching mechanism for operation of the latching finger 52 by simply inserting the short end 63 of the lever 50 into the pocket provided by the stamping 55 and the main body portion of the latching finger 52. The lever may then be pulled downwardly thus causing a rotation of the latching finger 52 about its pivot 51 until the latching finger 52 has been moved out of engagement with the fender. After the fender shield has been mounted on the fender again and the latching finger 52 moved into engagement with the fender, the operating lever 50 may be removed and placed in any suitable place, preferably the trunk or other locked compartment of the vehicle.

A third embodiment of the present invention is shown in Figures 9 and 10 of the drawings. The latching mechanism illustrated in these two figures includes a latching finger 65 and an operating member or lever 66. The latching finger 65 is a channel-shaped member which is pivotally mounted on the upper end of the strut 22 by means of a stud 67. The stud 67 in this case has a portion which projects rearwardly from the assembly for the additional reception of the upper end of the operating lever 66. The latching finger 65 includes a curved upper end portion 68 which acts as a cam for guiding the latching finger into engagement with the fender, and an inturned lower end 69 which frictionally bears against the strut 22 and tends to retain the latching finger 65 in any desired latching position.

The operating member or lever 66 is of angular shape having a short upper end portion 70 and a relatively long handle portion 71. The upper end of the short leg portion 70 is provided with a hole 72 which enables the operating lever 66 to be passed over the outer end of the stud 67. The short leg portion 70 is also provided with a rectangular opening 73 which is arranged to receive a tongue 74 which is struck out from the lower end of the latching finger 65.

A stop or limit means for determining the maximum rotational movement of the latching finger 65 is provided by a struck out tongue 75 from the strut 22.

To unlatch the latching finger 65 the operating member or lever 66 is hooked over the stud 67 and the tongue 74 and then rotated until the latching finger 65 is moved out of engagement with the fender. To move the latching finger 65 into its latched position, the reverse operation takes place. After the latching finger 65 has been moved to its latched position, the operating member or lever 66 is lifted off of the stud 67 and the tongue 74 and placed in any convenient place, preferably the trunk or other lock compartment of the vehicle.

From the above descriptions, it will be apparent that I have provided novel latching mechanism which deters and hinders any unauthorized removal of the fender shield from the fender.

While I have shown particular embodiments of my invention, it will, of course, be understood that I do not wish to be limited thereto, since many modifications may be made, and, I, therefore, contemplate by the appended claims to cover all such modifications as fall within the true spirit and scope of my invention.

I claim as my invention:

1. A latching mechanism for a fender shield comprising a latching finger pivotally mounted in proximity to its center on said shield, said finger including a fender engaging portion on one side of said pivot and a tail portion on the other side, said tail portion having its tip bent back on itself to form a hook, a tongue struck from said tail portion between said hook and the pivot point of said finger, a lever having a pair of openings therein for receiving said tongue and said hook, the opening for receiving said hook having a portion which is larger than said hook and through which said hook may be bodily passed and said opening also having an additional portion of substantially the same width as the width of said hook, the portion of said lever which defines the end of said last mentioned portion of said opening being arranged to be engaged by said hook after said hook has passed through said first portion of said opening.

2. A latching mechanism for a fender shield comprising a latching finger pivotally mounted in proximity to its center on said shield, said finger including a fender engaging portion on one side of said pivot and a tail portion on the other side, said tail portion having its tip bent back on itself to form a hook, a tongue struck from said tail portion between said hook and the pivot point of said finger, and a lever having a rectangular opening therein for receiving said tongue and having a triangular opening therein for receiving said hook, one corner of the triangular opening being cut back to substantially the width of said hook, whereby said lever may be hooked onto said tail portion and said latching finger operated by manual movement of said lever.

WILLIAM B. SCHUEREN.